United States Patent [19]

Palmqvist et al.

[11] Patent Number: 4,685,189
[45] Date of Patent: Aug. 11, 1987

[54] PLIABLE SLEEVE WHICH IS TURNED INSIDE OUT AND LUBRICATED WHEN FITTED ON A CORE AND METHOD OF INSTALLING SAME

[75] Inventors: Lars I. Palmqvist; Bolennart A. Svensson, both of Alingsås, Sweden

[73] Assignee: Kabeldon Aktiebolag, Alingsas, Sweden

[21] Appl. No.: 851,133

[22] PCT Filed: Jun. 18, 1985

[86] PCT No.: PCT/SE85/00256
§ 371 Date: Feb. 28, 1986
§ 102(e) Date: Feb. 28, 1986

[87] PCT Pub. No.: WO86/01047
PCT Pub. Date: Feb. 13, 1986

[30] Foreign Application Priority Data

Jul. 25, 1984 [SE] Sweden ................................ 8403849

[51] Int. Cl.⁴ ..................... B29C 63/22; H02G 15/02; H01B 17/58
[52] U.S. Cl. ......................................... 29/450; 29/458; 74/551.9; 156/294; 174/74 A
[58] Field of Search ................... 174/74 A, 77 S, 135, 174/138 F, 167; 29/235, 450, 458; 74/551.9; 135/86; 156/294; 339/213 R, 213 S, 213 T

[56] References Cited

U.S. PATENT DOCUMENTS

| 1,888,349 | 11/1932 | Jacoby | 604/256 |
| 2,269,076 | 1/1942 | Boll | 174/77 S X |
| 3,992,570 | 11/1976 | Beinhaur | 174/74 A X |
| 4,506,430 | 3/1985 | Guzay, Jr. | 29/450 |

FOREIGN PATENT DOCUMENTS

| 826320 | 12/1951 | Fed. Rep. of Germany | 174/77 S |
| 556110 | 4/1923 | France | 74/551.9 |
| 57-24215 | 2/1982 | Japan | 29/450 |

Primary Examiner—Laramie E. Askin
Attorney, Agent, or Firm—Roberts Spiecens & Cohen

[57] ABSTRACT

A sleeve of pliable, elastic material, such as silicone rubber or the like, intended to be turned inside out when being fitted onto a slender elongated core, for example an end of a high tension cable. The sleeve is provided on its outer surface, which surface is turned inwardly prior to fitting the sleeve on the core, with a plurality of densely located hollows (8) which are intended to accommodate a lubricant (12). The hollows may, for example, have the form of closely adjacent grooves extending around the sleeve (1) or of densely located craters.

6 Claims, 5 Drawing Figures

Fig. 1a
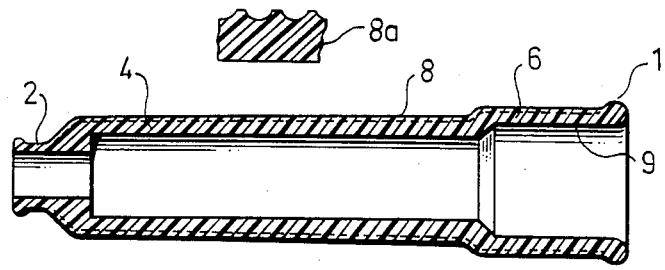
Fig. 1
Fig. 2
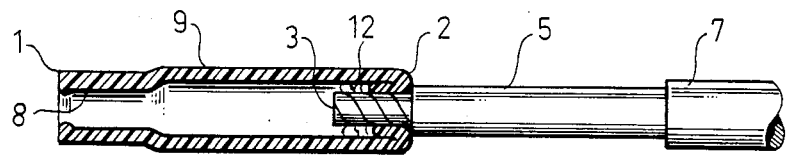
Fig. 3
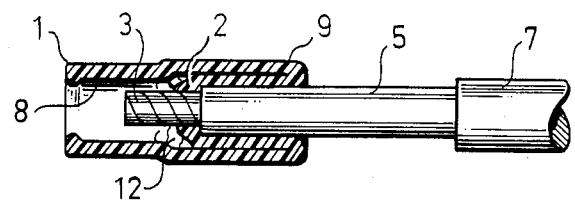
Fig. 4
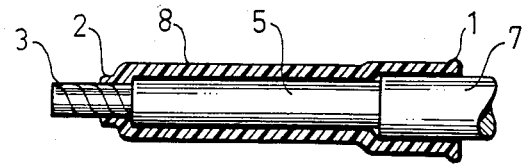

PLIABLE SLEEVE WHICH IS TURNED INSIDE OUT AND LUBRICATED WHEN FITTED ON A CORE AND METHOD OF INSTALLING SAME

FIELD OF THE INVENTION

The present invention relates to a sleeve which is made of a pliable, elastic material and which is intended to be turned inside out when fitted onto a slender elongated core.

BACKGROUND

Sleeves made of pliable, elastic material and intended to be fitted on a slender, elongated core, such as end-pieces for high tension cables, are known in the art, for example, Swedish 405 904. It is often difficult to insert this known kind of sleeve into position, even when using a lubricant, since the lubricant is prone to be carried away by the leading edge of the sleeve as it is fitted, and fails to remain between the sleeve and the core.

A method of holding the sleeve distended during the mounting of said sleeve, so that the lubricant remains within the sleeve, is described in Swedish 424 386.

A sleeve which is intended to fully enclose the end of a cable and which is intended to be turned inside out when being fitted thereon is described in U.S. Pat. No. 3,992,570. It is stated in this patent that the sleeve shall be inflated, so as to reduce friction between surfaces which slide against one another.

The fact that when a sleeve is fitted onto a slender, elongated core, the lubricant applied is picked up and displaced by the leading edge of the sleeve with no reduction in friction is a problem which often occurs.

SUMMARY OF THE INVENTION

The sleeve according to the invention is of the type intended to be turned inside out when fitted on a core and in order to reduce friction between the mutually contacting and sliding surfaces, the sleeve is provided with an outer-surface structure including densely located lubricant accommodating hollows. The hollows may have the form of closely adjacent grooves extending around the sleeve.

As a result of the presence of these grooves, the lubricant will remain on the mutually sliding surfaces, without being forced away as the sleeve is fitted on the core.

BRIEF DESCRIPTION OF THE DRAWING

An embodiment of a sleeve according to the invention will now be described with reference to the accompanying drawing, in which:

FIG. 1 is a detail, on enlarged scale, of a portion of the sleeve in FIG. 1; and FIGS. 1-4 illustrate different stages in the fitting of the sleeve on a core.

DETAILED DESCRIPTION OF A BEST MODE FOR CARRYING OUT THE INVENTION

In the illustrated embodiment, a sleeve is intended to be fitted as an end-piece on a slender, elongated core at the end of a high tension cable. The end-piece is made of a pliable, elastic material, for example, silicone rubber, having a hardness of about 35 Shore A.

As shown in FIG. 1, the end-piece 1 is cylindrical and includes a plurality of parts of different diameters corresponding to the core. The end-piece has a part 2 of smallest diameter located at one end thereof, such that said end-part will fit over that end 3 of the cable which has been stripped of insulation, c.f. also FIGS. 2-4.

Commencing from a location adjacent the narrowest end-part 2, the end-piece includes, along the major part of its length, a part 4 of larger diameter which is able to fit over the cable-insulation 5, which is free from external cable-reinforcement.

A part 6 of the end of the end-piece remote from the narrowest end-part 2 thereof has the largest diameter, to enable it to fit over the outer reinforcement 7 of the cable.

The outer surface of the sleeve is provided with densely located hollows 8 along substantially the entire length of the sleeve.

The hollows 8 are in the form of densely located grooves extending around said end-piece; the grooves in this embodiment have a depth of 0.5 mm and an interspacing or pitch of 0.75 mm, c.f. the enlarged detail 8a of FIG. 1a.

In accordance with an alternative embodiment, the hollows 8 may have a different form, for example the form of a dense scattering of cup-shaped craters or the like. The dimensions of the hollows are adapted to the intended purpose of the hollows, as will become more apparent hereinafter.

The inner surface 9 of the end-piece is entirely smooth.

The end-piece 1 is intended to be turned inside out when being fitted on the end of the cable. Consequently, as illustrated in FIG. 2, mounting of the end-piece 1 commences with the end-piece turned inside out, so that the surface with the hollows 8 faces inwardly and the smooth surface 9 faces outwardly.

A small quantity of lubricant 12 is applied inwardly in the narrow end 2, and this end is then threaded over the bared end 3 of the cable.

As illustrated in FIG. 3, as insertion of the cable into the end-piece proceeds, the mutually opposing surfaces with hollows 8 will slide against one another. With hitherto known sleeves, this sliding action is associated wtih considerable friction, which renders fitting of the sleeve extremely difficult; the lubricant is normally forced away from the surfaces by the pressure forces prevailing therebetween and halts at the location at which the surfaces separate, one from the other.

Each of the hollows 8 according to the invention takes up a small quantity of lubricant and carries it to those parts of the surface which face one another. It will be evident that the intended function of the hollows 8 is to take up lubricant so as to reduce friction and thereby facilitate fitting of the end-piece onto the cable.

The end-piece is fitted onto the cable until the entire end-piece 1 has been turned back to its intended original state, with the surface having hollows 8 facing outwards and with the widest part 6 of the end-piece embracing a part of the cable reinforcement 7.

In alternative embodiments of the sleeve according to the invention, the sleeve is made of a different material and has other intended usages than that described here.

What is claimed is:

1. An end piece construction for an elongated core comprising: a sleeve adapted for being mounted on an elongated core, said sleeve being made of a pliable, elastic material so as to be capable of being turned inside out, said sleeve having an initial state in preparation for insertion of a core within the sleeve, said sleeve in said initial state including an end portion turned inwardly into the remainder of the sleeve, and a quantity of lubricant within said sleeve adjacent said end portion, said sleeve in said initial state having a surface facing inwardly which is provided with a plurality of hollows therein distributed over substantially the entirety thereof, said surface of said sleeve sliding on itself during insertion of a core while the sleeve is being entirely turned inside out, said sleeve, when turned inside out, having said surface which previously faced inwardly then facing outwardly, said hollows being dimensioned and located to take up said lubricant and carry it along as the sleeve is being turned inside out to provide lubrication for said surface as it slides on itself.

2. An end piece construction as claimed in claim 1 wherein said hollows are closely spaced annular grooves in said initially inwardly facing surface of the sleeve.

3. A method of installing a sleeve on an elongated core, said method comprising: providing a sleeve of pliable elastic material having an inner surface with a plurality of hollows therein distributed over substantially the entirety thereof, said sleeve having an end portion turned inwardly into the remainder of the sleeve so that said inner surface forms the outer surface of said end portion, placing a quantity of lubricant in said sleeve adjacent said end portion, inserting an elongated core into said inwardly turned end portion of the sleeve, and advancing the core to cause the sleeve to be turned inside-out as the core is being inserted into the sleeve, said hollows taking up the lubricant in said sleeve and carrying the lubricant along as the sleeve is being turned inside out to facilitate the sliding of said inner surface on itself during insertion of the core in said sleeve, said inner surface of the sleeve sliding on itself as the sleeve is being turned inside-out and forming the outer surface of the sleeve when the sleeve is fully installed on the core.

4. A method as claimed in claim 3 wherein the step of taking up the lubricant by said hollows comprises successively filling said hollows with lubricant as the core is inserted into the sleeve and the sleeve is turned inside-out.

5. A method as claimed in claim 3 wherein the step of providing a sleeve with hollows comprises forming said hollows as adjacent annular grooves in said inner surface of the sleeve.

6. A method as claimed in claim 3 wherein said step of placing a quantity of lubricant comprises placing the lubricant inwardly of said end portion of said sleeve.

* * * * *